(12) United States Patent
Li et al.

(10) Patent No.: US 11,254,270 B1
(45) Date of Patent: Feb. 22, 2022

(54) TECHNOLOGIES FOR USING IMAGE ANALYSIS TO FACILITATE ADJUSTMENTS OF VEHICLE COMPONENTS

(71) Applicant: STATE FARM MUTUAL AUTOMOBILE INSURANCE COMPANY, Bloomington, IL (US)

(72) Inventors: Yuntao Li, Champaign, IL (US); Dingchao Zhang, Normal, IL (US); Jeffrey S. Myers, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 114 days.

(21) Appl. No.: 15/969,501

(22) Filed: May 2, 2018

(51) Int. Cl.
| | |
|---|---|
| *B60R 16/00* | (2006.01) |
| *B60R 16/037* | (2006.01) |
| *B60K 35/00* | (2006.01) |
| *B60R 21/015* | (2006.01) |
| *B60N 2/02* | (2006.01) |
| *G06K 9/00* | (2022.01) |

(52) U.S. Cl.
CPC .......... *B60R 16/037* (2013.01); *B60K 35/00* (2013.01); *B60N 2/0224* (2013.01); *B60R 21/015* (2013.01); *G06K 9/00288* (2013.01); *G06K 9/00838* (2013.01); *B60K 2370/52* (2019.05); *B60K 2370/736* (2019.05); *G06K 2009/00322* (2013.01)

(58) Field of Classification Search
CPC ..... B60R 16/037; B60R 21/015; B60K 35/00; B60K 2370/52; B60K 2370/736; B60N 2/0224; G06K 9/00838; G06K 9/00288; G06K 2009/00322
See application file for complete search history.

(56) References Cited

U.S. PATENT DOCUMENTS

| | | | |
|---|---|---|---|
| 5,008,946 A | 4/1991 | Ando | |
| 6,927,694 B1 | 8/2005 | Smith et al. | |
| 10,275,670 B1* | 4/2019 | Li | B60R 25/305 |
| 2002/0116106 A1* | 8/2002 | Breed | B60Q 1/143 |
| | | | 701/45 |
| 2004/0234103 A1 | 11/2004 | Steffein | |
| 2005/0156725 A1 | 7/2005 | Muhammad | |
| 2008/0219501 A1 | 9/2008 | Matsumoto | |

(Continued)

OTHER PUBLICATIONS

Final Office Action dated Mar. 6, 2020 for U.S. Appl. No. 16/273,642 "Image Analysis Technologies for Identifying Abnormal Vehicle Conditions", Li, 13 pages.

(Continued)

*Primary Examiner* — Todd Melton
*Assistant Examiner* — Jason R Roberson
(74) *Attorney, Agent, or Firm* — Lee & Hayes, P.C.

(57) ABSTRACT

Systems and methods for using image analysis techniques to facilitate adjustments to vehicle components are disclosed. According to aspects, a computing device may access and analyze image data depicting an individual(s) within a vehicle, and in particular determine a positioning of the individual(s) within the vehicle. Based on the positioning, the computing device may determine how to adjust a vehicle component(s) to its optimal configuration, and may facilitate adjustment of the vehicle component(s) accordingly.

21 Claims, 6 Drawing Sheets

(56) References Cited

U.S. PATENT DOCUMENTS

| | | | |
|---|---|---|---|
| 2012/0148117 A1* | 6/2012 | Chang | G06K 9/00926 382/118 |
| 2012/0148159 A1 | 6/2012 | Kaneda et al. | |
| 2013/0238167 A1 | 9/2013 | Stanfield et al. | |
| 2013/0311001 A1 | 11/2013 | Hampiholi | |
| 2014/0093133 A1* | 4/2014 | Frank | G06K 9/00838 382/104 |
| 2014/0200737 A1* | 7/2014 | Lortz | B60R 16/037 701/1 |
| 2015/0235484 A1 | 8/2015 | Kraeling et al. | |
| 2015/0363986 A1* | 12/2015 | Hoyos | H04W 4/40 340/5.61 |
| 2016/0262682 A1 | 9/2016 | Omi | |
| 2016/0300242 A1* | 10/2016 | Truong | G10L 17/22 |
| 2017/0043783 A1 | 2/2017 | Shaw | |
| 2017/0066406 A1 | 3/2017 | Ricci | |
| 2017/0161576 A1 | 6/2017 | Banno et al. | |
| 2017/0247000 A1* | 8/2017 | Ricci | B60R 16/037 |
| 2018/0065582 A1* | 3/2018 | Miller | G06K 9/00832 |
| 2018/0211541 A1 | 7/2018 | Rakah et al. | |
| 2018/0370363 A1* | 12/2018 | Vinogradov | B60K 37/04 |
| 2019/0283579 A1 | 9/2019 | Munaoka et al. | |
| 2019/0300002 A1 | 10/2019 | Fung et al. | |

OTHER PUBLICATIONS

Non-Final Office Action from U.S. Appl. No. 15/914,794, Zhang et al., dated Nov. 15, 2019, 19 pages.

Non-Final Office Action dated Nov. 20, 2019 for U.S. Appl. No. 16/273,642 "Image Analysis Technologies for Identifying Abnormal Vehicle Conditions", Li, 15 pages.

Office Action from U.S. Appl. No. 15/914,794, Zhang et al, dated Feb. 20, 2020, 24 pages.

Non-Final Office Action dated Jun. 27, 2018 for U.S. Appl. No. 15/914,745 "Image Analysis Technologies for Identifying Abnormal Vehicle Conditions", Li, 16 pages.

* cited by examiner

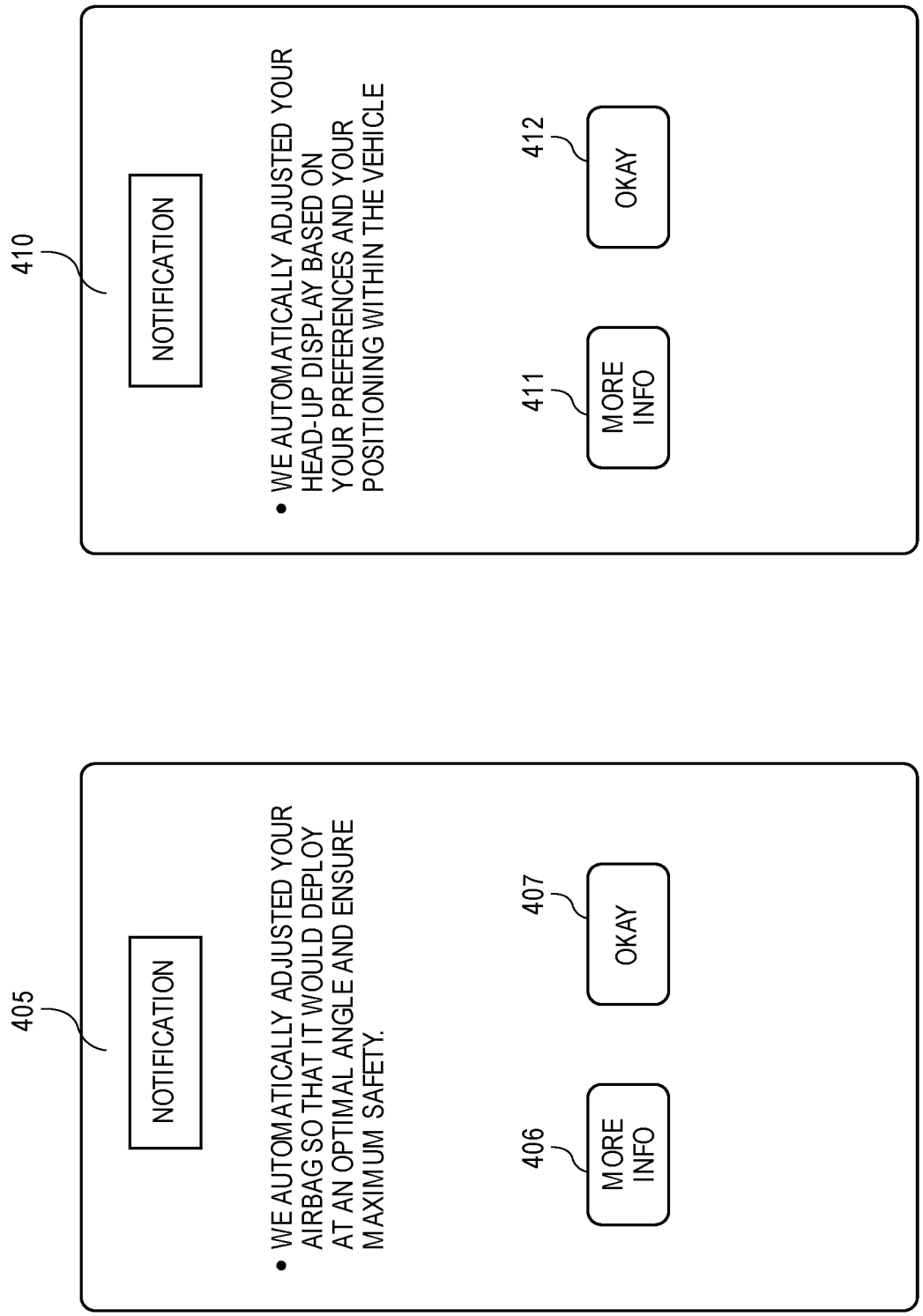

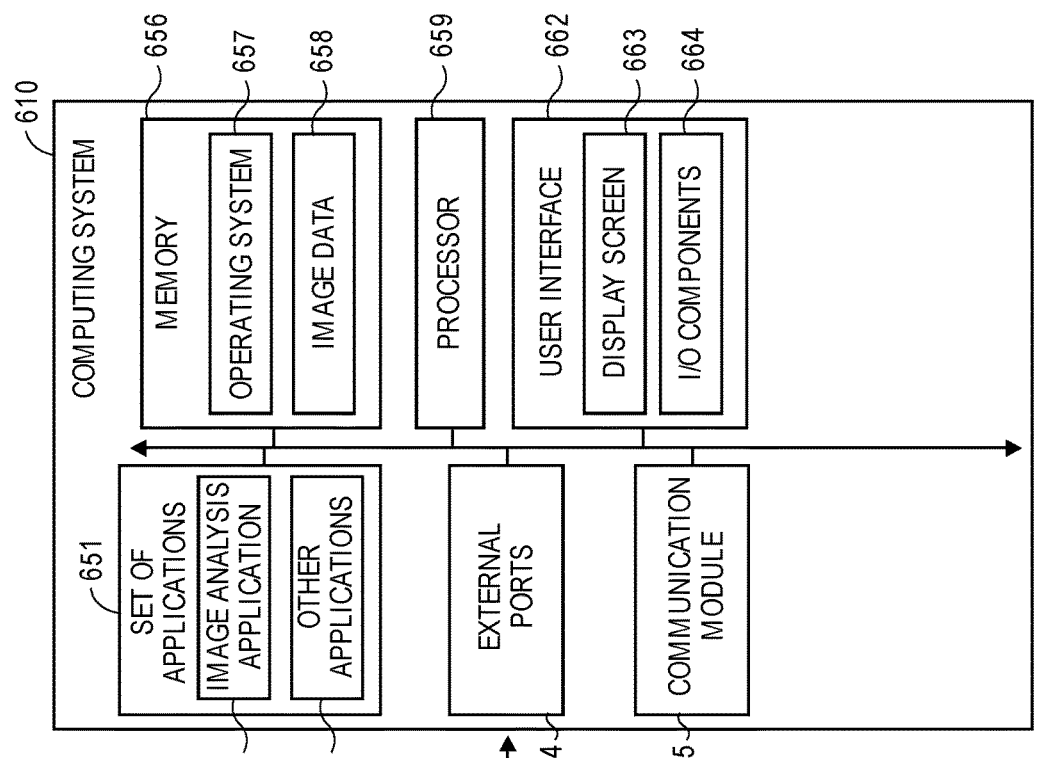
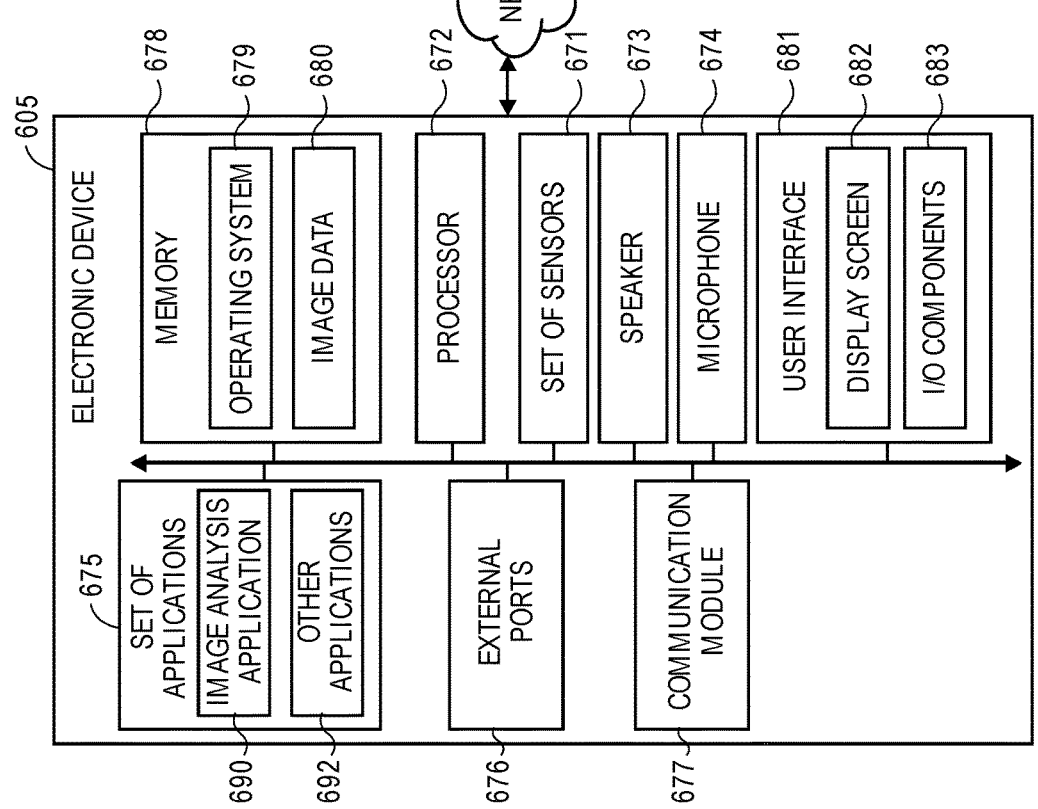
FIG. 6

TECHNOLOGIES FOR USING IMAGE ANALYSIS TO FACILITATE ADJUSTMENTS OF VEHICLE COMPONENTS

FIELD OF THE DISCLOSURE

The present disclosure is directed to image analysis technologies in association with vehicle components. In particular, the present disclosure is directed to systems and methods for using image analysis techniques to facilitate adjustments of vehicle components.

BACKGROUND

Individuals frequently operate or otherwise travel in vehicles, where the environments and conditions of the vehicle operation may be varied. Generally, vehicles may be equipped or configured with a plurality of different components that may enable and/or assist with the operation or ability to travel in the vehicles. For example, a vehicle typically includes a steering wheel, a driver's seat, a rearview mirror, a head-up display (HUD), and/or other components. Additionally, each component may have a particular configuration. For example, a steering wheel has a height adjustment, a driver's seat has multiple position adjustments, and a rearview mirror has a swivel-based adjustment.

However, vehicles are often operated by and traveled in by multiple individuals, where the individuals vary in physical dimensions (e.g., height, weight, length, etc.). Thus, an individual's positioning within a vehicle varies among individuals, and accordingly the individual's interaction or positioning relative to the components varies among the individuals. Additionally, some individuals may neglect to adjust the components to an improved or optimized configuration, or may manually make adjustments which is tedious and can be a safety risk.

Therefore, there is an opportunity for techniques and technologies to using image analysis to automatically facilitate the adjustment of vehicle components.

SUMMARY

In an embodiment, a system for configuring components of a vehicle is provided. The system may include: at least one image sensor configured to capture image data, a vehicle component having a configuration, a non-transitory memory storing a set of computer-executable instructions, and a processor communicatively coupled to at least one image sensor, the vehicle component, and the memory. The processor may be configured to execute the computer-executable instructions to cause the processor to: access the image data from the at least one image sensor, the image data comprising a plurality of image frames depicting an interior of the vehicle, determine, from the plurality of image frames, at least a portion of image frames that depict an individual located within the vehicle, analyze at least the portion of image frames to determine a positioning of the individual within the vehicle, determine, based on the positioning of the individual within the vehicle, an adjustment to the configuration of the vehicle component, and cause the vehicle component to implement the adjustment to the configuration.

In another embodiment, a method of configuring a vehicle component within a vehicle is provided, where the vehicle component may have a configuration. The method may include: accessing image data from at least one image sensor, the image data comprising a plurality of image frames depicting an interior of the vehicle, determining, from the plurality of image frames, at least a portion of image frames that depict an individual located within the vehicle, analyzing, by a computer processor, at least the portion of image frames to determine a positioning of the individual within the vehicle, determining, based on the positioning of the individual within the vehicle, an adjustment to the configuration of the vehicle component, and causing the vehicle component to implement the adjustment to the configuration.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIGS. 4A and 4B illustrate example interfaces associated with notifying individuals of adjustments to vehicle components, in accordance with some embodiments.

FIG. 6 is a hardware diagram of an example electronic device and an example computing system, in accordance with some embodiments.

The figures depict various aspects of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The present embodiments may relate to, inter alia, using image analysis to determine adjustments to configurations of vehicle components, and effectively facilitating the adjustments. The present embodiments may further relate to effectively and efficiently generating and communicating notifications or alerts of the component adjustments to appropriate individuals.

According to certain aspects, systems and methods may capture image data including a plurality of image frames depicting a portion(s) of a vehicle. The systems and methods may identify those of the image frames that depict one or more individuals who are located within the vehicle. The vehicle may be configured with one or more vehicle components (e.g., HUD, rearview mirror, infotainment, etc.) used or accessible by the individual(s), where each vehicle component may have a current configuration. In analyzing the image frames, the systems and methods may facilitate one or more assessments in an effort to determine a positioning of the individual within the vehicle, as well as determine an optimized configuration of a vehicle component based on the individual's positioning.

The systems and methods may further determine an adjustment to make to the vehicle component to transition from the current configuration to the optimized configuration, and may perform certain actions to facilitate the adjustment. Additionally, the systems and methods may generate an alert or notification in response to facilitating the adjustment, and may cause the alert or notification to be presented for review by the individual and/or an additional individual(s).

The systems and methods therefore offer numerous benefits. In particular, the systems and methods effectively determine how to adjust vehicle components to achieve optimized configurations based on the positioning of individuals within vehicles. Accordingly, operation of the vehicles by the individuals may be safer, more effective, more efficient, and more enjoyable. It should be appreciated that additional benefits are envisioned.

Figure 1:
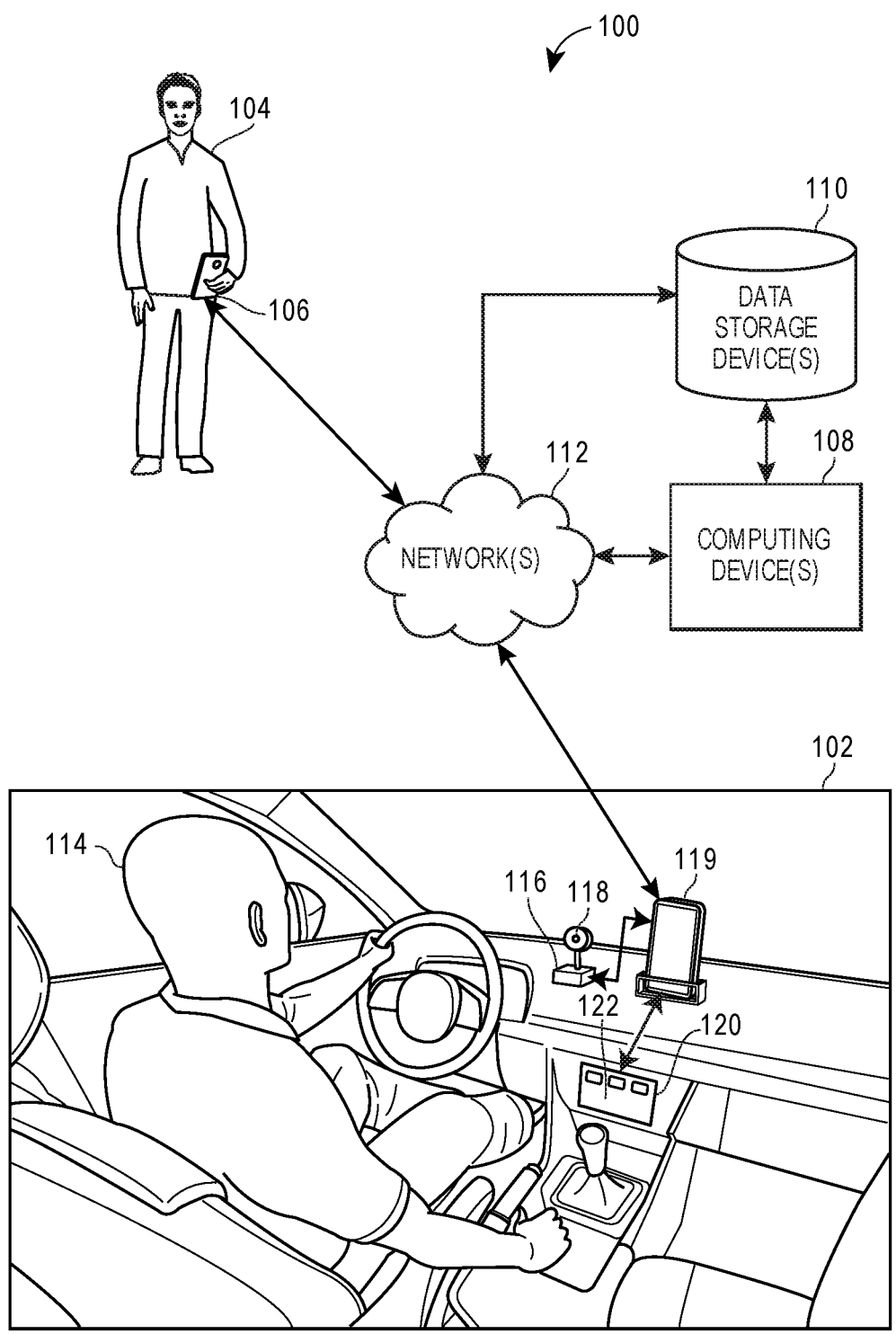
FIG. 1 depicts an overview of components and entities associated with the systems and methods, in accordance with some embodiments.

FIG. 1 illustrates a block diagram of an exemplary system 100 including components and entities configured to facilitate various of the functionalities as discussed herein, in particular detecting abnormal operating conditions and accordingly generating notifications. The system 100 may include both hardware and software components, as well as various data communication channels or links for communicating data between the various hardware and software components, as is described below.

The system 100 may include a vehicle, with an illustration 102 of a portion of the vehicle being shown in FIG. 1 for ease of illustration and explanation. The vehicle may be, for example, an automobile, car, truck, tow truck, snowplow, boat, motorcycle, motorbike, scooter, recreational vehicle, or any other type of vehicle capable of roadway or water travel. According to embodiments, the vehicle may be an autonomous vehicle capable of at least partial (or total) autonomous operation by a computer via the collection and analysis of various sensor data.

As depicted in FIG. 1, an interior of the vehicle may include one or more occupants (generally, individual(s)), such as an operator 114 (and one or more passengers, not shown in FIG. 1); a monitoring device 116, which may include an image capturing component(s) 118 (e.g., a camera); a mobile computing device 119; and an infotainment device (or system) 120. The image capturing component(s) 118 may be configured to capture digital image data (e.g., in the form of one or more image frames) depicting various portions of the interior of the vehicle. For example, the image capturing component(s) 118 may capture image data that depicts a face, a body, and or another portion(s) of the operator 114. Additionally or alternatively, the image capturing component(s) 118 may capture image data that depicts a body (e.g., a face and/or other portion of a body) of a passenger (not shown in FIG. 1) in a front or rear seat of the vehicle. The monitoring device 116 may be located within or external to the vehicle. The monitoring device 116 may transmit, to the mobile computing device 119, any image data captured by the image capturing component(s) 118.

Each of the monitoring device 116 and the mobile computing device 119 may be any type of electronic device such as a mobile device (e.g., a smartphone), notebook computer, tablet, phablet, GPS (Global Positioning System) or GPS-enabled device, smart watch, smart glasses, smart bracelet, wearable electronic, PDA (personal digital assistants), pager, computing device configured for wireless communication, and/or the like. Further, each of the monitoring device 116 and the mobile computing device 119 may be equipped or configured with a set of sensors, such as a location module (e.g., a GPS chip), an image sensor, an accelerometer, a clock, a gyroscope, a compass, a yaw rate sensor, a tilt sensor, and/or other sensors. In some embodiments or under certain conditions, each of the monitoring device 116 and the mobile computing device 119 may function as thin-client devices that outsource some or most of the processing to one or more of back-end components.

The monitoring device 116 and/or the mobile computing device 119 may belong to or be otherwise associated with the operator 114 (or with another individual located in the vehicle), where the operator 114 may be an owner of the vehicle or otherwise associated with the vehicle. For example, the operator 114 may rent the vehicle for a variable or allotted time period, the operator 114 may at least partially operate the vehicle as part of a rideshare, and/or the operator 114 may have a policy for the vehicle.

The infotainment device 120 may be any suitable device (or system) that may provide suitable and/or desired information and/or entertainment content to one or more occupants, such as the operator 114. In one example, the infotainment device 120 may include a user interface 122 that may include a set of selections via which the operator 114 or other occupant(s) (such other occupants not being shown in FIG. 1) may access navigation information, driving statistics, traffic information, radio controls, and/or any other suitable information and/or entertainment content. The infotainment device 120 may communicate with the monitoring device 116 and/or the mobile computing device 119, such as via one or more wired or wireless connections. The infotainment device 120 (and/or another component) may implement a head-up display (HUD) that may be configured to display or project various information (e.g., velocity, heading, ETA, distance, etc.) in a field of view of the operator 114 or another individual. For example, the HUD may project various information on a windshield of the vehicle.

The system 100 may further include a set of back-end components including a computing device(s) 108 and a data storage device(s) 110. Each of the infotainment device 120, the monitoring device 116, and the mobile computing device 119 may communicate with the back-end components via a network(s) 112. The network(s) 112 may include a proprietary network, a secure public internet, a virtual private network, and/or some other type of network, such as dedicated access lines, plain ordinary telephone lines, satellite links, cellular data networks, combinations of these and/or other types of networks. The network(s) 112 may utilize one or more radio frequency communication links to communicatively connect to any of the infotainment device 120, the monitoring device 116, and the mobile computing device 119. Where the network(s) 112 comprises the Internet or other data packet network, data communications may take place over the network(s) 112 via an Internet or other suitable data packet communication protocol. In some arrangements, the network(s) 112 additionally or alternatively includes one or more wired communication links or networks.

The computing device(s) 108 may include one or more servers or computing devices, which may be implemented as a server bank or cloud computing system. The computing device(s) 108 may include one or more computer processors adapted and configured to execute various software applications and components of the system 100, in addition to other software applications. The computing device(s) 108 may interface with the data storage device(s) 110, which may be configured to store data related to the operation of the vehicle and/or the operator 114 (e.g., vehicle operation preferences of the operator 114), the environment and context in which the vehicle is operating, and/or other information. For example, the data storage device(s) 110 may be implemented as a data bank or a cloud data storage system, at least a portion of which may be locally accessed by the computing device(s) 108 using a local access mechanism such as a function call or database access mechanism, and/or at least a portion of which may be remotely accessed by the computing device(s) 108 using a remote access mechanism such as a communication protocol. The computing device(s) 108 may access data stored in the data storage device(s) 110 when executing various functions and tasks associated with the present disclosure.

To communicate with the computing device(s) 108, the infotainment device 120, the monitoring device 116, and/or the mobile computing device 119 may include a communication component(s) that are configured to transmit information to and receive information from the computing device(s) 108. The communication components may include one or more wireless transmitters or transceivers operating at any desired or suitable frequency or frequencies, and according to various communication protocols (e.g., GSM, CDMA, LTE, one or more IEEE 802.11 Standards such as Wi-Fi, WiMAX, BLUETOOTH, etc.).

As illustrated in FIG. 1, a user 104 may have an electronic device 106 capable of communication with other components of the system 100 via the network(s) 112. In particular, the electronic device 106 may communicate with any of the infotainment device 120, the monitoring device 116, the mobile computing device 119, and the computing device(s) 108. According to embodiments, the user 104 may be an individual associated with the vehicle. For example, the user 104 may own the vehicle and/or may be a policyholder of an insurance policy on the vehicle. According to embodiments, the electronic device 106 may be configured to receive and present any notifications, alerts, reports, or the like, as described herein.

Generally, any of the computing device(s) 108, infotainment device 120, monitoring device 116, mobile computing device 119, or electronic device 106 may facilitate various of the functionalities as described herein, for example the image capture and analysis, the alert generation and presentation, the report generation, and/or other functionalities. Thus, the computing device(s) 108, infotainment device 120, monitoring device 116, mobile computing device 119, and/or electronic device 106 may communicate amongst each other and transmit any captured or analyzed data (e.g., the image data).

Figure 2:
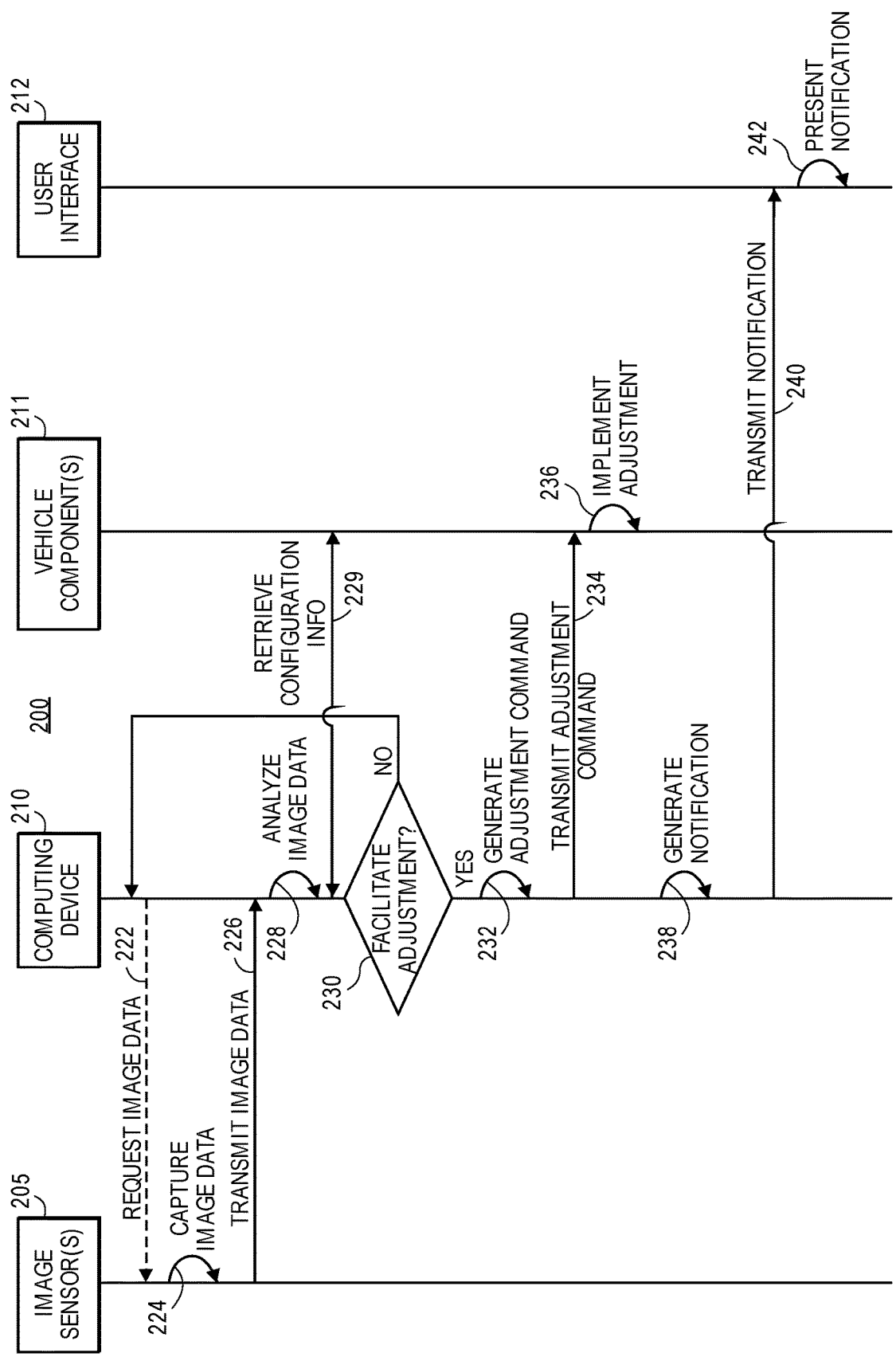
FIG. 2 depicts an example signal diagram associated with using image analysis to facilitate adjustment of vehicle components, in accordance with some embodiments.

Generally, the vehicle depicted in FIG. 1 may be equipped or configured with various components that are used or accessible by the operator 114 or another individual(s) within the vehicle. For example, the components may include a steering wheel, a driver's seat, passenger seat(s), a rearview mirror, a HUD, a user interface (e.g., infotainment or another type of screen(s)), audio controls, climate controls, and/or vehicle operation controls (e.g., knobs, levers, dials, etc.). It should be appreciated that other vehicle components are envisioned, where each vehicle component may be used by any individual, accessible by an individual, or otherwise relevant to the use of the vehicle. Each vehicle component may have a configuration that may be modified or adjusted. For example, a steering wheel has an adjustable height, a HUD has an adjustable display location, and an audio system has adjustable controls. FIG. 2 describes additional functionalities associated with using image analysis to facilitate adjustment of the vehicle components.

FIG. 2 depicts a signal diagram 200 describing certain functionalities associated with the systems and methods. The signal diagram 200 may include one or more image sensors 205, a computing device 210, a vehicle component(s) 211, and a user interface 212. In an implementation, the image sensor(s) 205 may be incorporated in (or separate from) the computing device 210. The image sensor(s) 205 may be disposed within or external to a vehicle capable of operation by an operator, and may be third-party components and/or incorporated within components of the vehicle. The vehicle may transport one or more individuals, including an operator and optionally one or more passengers (or if the vehicle is an autonomous vehicle, each individual may be a passenger).

The user interface 212 may be separate from the computing device 210 and may be located within view of the one or more of the individual(s). The image sensor(s) 205 may be connected to the computing device 210 via one or more wired or wireless connections. The computing device 210 may be local to the vehicle (i.e., may be permanently or temporarily located within the vehicle) or may be remote from the vehicle. Each vehicle component 211 may be used by any individual, accessible by an individual, or otherwise relevant to the use of the vehicle, as discussed herein.

The signal diagram 200 may begin when the computing device 210 optionally requests (222) image data from the image sensor(s) 205. According to embodiments, the computing device 210 may automatically request the image data periodically (e.g., once every ten seconds, once every minute, once every hour), or a user of the computing device 210 (e.g., the operator or a passenger of the vehicle) may cause the computing device 210 to request the image data. Further, the request may include a specified amount of image data (e.g., a number of image frames) and/or a specific time component (e.g., real-time image(s), real-time video, image(s) and/or video recorded five minutes ago).

The image sensor(s) 205 may capture (224) image data, such as according to the request received from the computing device 210. According to embodiments, the image sensor(s) 205 may be positioned so that one or more individuals (e.g., the operator or passenger(s) of the vehicle) are physically within view. In an embodiment, the image sensor(s) 205 may automatically capture the image data continuously or periodically. After capturing the image data, the image sensor(s) 205 may transmit (226) the image data to the computing device 210. In one implementation, the image sensor(s) 205 may automatically send the image data to the computing device 210 in real-time or near real-time as the image sensor(s) 205 captures the image data, and/or in response to a request from the computing device 210. In another implementation, the image sensor(s) 205 may send previously-captured image data to the computing device 210, such as if the image sensor(s) 205 interfaces with some type of memory or storage. It should be appreciated that the image data may depict one or more individuals (e.g., the operator and/or a passenger(s) of the vehicle).

The computing device 210 may analyze (228) the image data, which may include a plurality of individual image frames. In an implementation, the computing device 210 may analyze the image data to determine whether an individual(s) is depicted in the image data. It should be appreciated that the computing device 210 may utilize various image processing techniques to detect whether an individual(s) is depicted in the image data, as discussed herein.

Generally, the computing device 210 may analyze the image data to determine a positioning of the individual(s) within the vehicle. In particular, the computing device 210 may determine a position of various portions of the individual, including a position for each of a head, arms, legs, torso, hip, and/or other portions of the individual(s). In operation, the computing device 210 may map each portion and the location(s) of each portion, such as via 3-D mapping or other imaging techniques. Additionally or alternatively, the computing device 210 may determine, estimate, or calculate dimensions associated with the various portions of the individual. For example, the computing device 210 may estimate a height of the individual based on a size of the individual's head, torso, and/or legs. Additionally or alternatively, the computing device 210 may utilize various image analysis and/or facial recognition techniques to identify the individual(s) and/or estimate an age(s) of the individual(s) depicted in the image data.

Generally, the vehicle component(s) 211 may have an associated configuration. In particular, the configuration may be a positioning(s), a setting(s), and/or the like, where the configuration may be modified or adjusted. For example, a steering wheel may have a configuration that specifies a positioning (e.g., vertical height) of the steering wheel. As another example, an airbag deployment device may have a configuration that specifies a deployment angle and/or velocity. For further example, a driver's seat may have a configuration that specifies a position (vertical, horizontal, and recline), and/or a seat temperature. The computing device 210 may interface with the vehicle component(s) 211 to retrieve (229) the configuration information for the vehicle component(s) 211, which may be representative of a current or real-time configuration of the vehicle component(s) 211. In an implementation, the computing device 210 may locally store the configuration information after retrieval.

Additionally, an optimized configuration may exist for the vehicle component(s) 211, based on the physical positioning of the individual, where the vehicle component(s) 211 may be adjusted to meet the optimized configuration. Generally, the optimized configuration may represent an ideal or beneficial configuration, positioning, or arrangement for an interaction or interplay between the individual and the vehicle component 211. The optimized configuration may be previously specified by a manufacturer or may be dynamically determined by the computing device 210. For example, a HUD may have an optimized projection location, a rearview mirror may have an optimized positioning, and/or an airbag may have an optimized deployment angle, based on the height of a driver in the driver's seat. As another example, a user interface may have an optimized rotation angle based on the forward positioning of a driver.

The individual(s) may have a set of preferences that may be locally stored by the computing device 210 or remotely accessed by the computing device 210 via a backend server. Accordingly, when the computing device 210 analyzes the image data and identifies an individual depicted in the image data (e.g., using a facial recognition technique), the computing device 210 may access the set of preferences for the individual.

The computing device 210 may determine (230) whether to facilitate an adjustment to the vehicle component(s) 211. In performing the determination, the computing device 210 may account for any combination of the configuration information retrieved in (229) and the results of the image data analysis. In an embodiment, the computing device 210 may determine, based on the positioning of the individual, an optimized configuration of the vehicle component(s) 211, and may determine whether and how the configuration information of the vehicle component(s) 211 differs from the optimized configuration. If there is a difference, then the computing device 210 may determine that an adjustment is needed ("YES"), and processing may proceed to (232). If there is not a difference, then the computing device 210 may determine that an adjustment is not needed ("NO"), and processing may repeat, end, or proceed to other functionality.

The computing device 210 may additionally account for the preferences of the individual(s) when determining whether to facilitate an adjustment to the vehicle component(s) 211. In particular, the difference between the configuration information of the vehicle component(s) 211 and the optimized configuration may indicate that an adjustment is not needed, however the configuration of the vehicle component 211 may not match the relevant preference of the individual (thus, the computing device 210 may determine that an adjustment is needed). The preferences of the individual may thus represent an override of or a modification to the optimized configuration.

At (232), the computing device 210 may generate an adjustment command that reflects the adjustment needed to the vehicle component 211 to align with the adjustment determined in (230). In particular, the adjustment command may reflect how the vehicle component 211 should adjust to meet the optimized configuration, and/or optionally the preference(s) of the individual. For example, the adjustment command may be to move a driver's seat two inches forward. As an additional example, the adjustment command may be to angle a user interface further toward a driver's face.

The computing device 210 may transmit (234) the adjustment command to the vehicle component 211, such as via a wired or wireless connection. Accordingly, the vehicle component 211 may implement (236) the adjustment according to the received adjustment command. The vehicle component 211 may thus have a current configuration that matches the optimized configuration, and/or optionally the preference(s) of the individual.

The computing device 210 may generate (238) a notification that indicates the adjustment. In embodiments, the notification may be in graphical form (e.g., including text and/or images), or may be in audible form (e.g., automatically generated audio that describes the adjustment).

The computing device 210 may transmit (240) the notification to the user interface 212. After receiving the notification, the user interface 212 may present (242) the notification. In particular, the user interface 212 may present the notification either graphically, audibly, or some other form of presentation. Thus, any individual(s) in proximity to the user interface 212 may review the notification and at least be notified of the component adjustment.

Generally, various functionalities associated with the systems and methods are envisioned. The functionalities may be facilitated or performed by a combination of components discussed herein, such as the image sensor(s) 205, the computing device 210, and/or the user interface 212 as discussed with respect to FIG. 2.

In particular, image frames may be captured and monitored for the detection of a depicted face of an individual, and facial detection using facial landmarks may be performed. After facial regions are determined, the components may compute a series of metrics describing facial attributes and movement to determine reference values indicating a normal state of the individual (e.g., over the first 10 frames), which may include the individual's standard posture, facial characteristics, and/or the like. According to embodiments, the reference values may have respective lower bounds and upper bounds.

The components may determine whether a face depicted in the image frames is known. In embodiments, a face recognition module may be configured to identify known and unknown faces. A database, such as a database implemented in a backend computing device, may store images of known faces, where each face may be encoded into a vector of real numbers as a unique feature associated with each face. Additionally, a machine learning algorithm may compare a similarity between encodings of any two faces.

If the similarly between a detected face and a stored (i.e., known) face is below a threshold metric, the detected face may be deemed as unknown or unauthorized and may be indicated as such (e.g., displayed within a red box in a user interface). If the face is known, the components may measure metrics depicted in image frames based on the determined reference values. In particular, the components may analyze subsequent image frames to calculate depicted metrics and compare the calculated metrics to the determined reference values.

Generally, the components may be configured to employ various image analysis techniques to determine an amount of individuals within the vehicle as well as a position of each individual within the vehicle. Additionally or alternatively, the components may employ various image analysis techniques to estimate an age of an individual(s) within the vehicle. In particular, the components may segment out, using a deep learning neural network model from an image frame, a facial region of an individual along with certain facial landmarks. Additionally, the components may measure color and texture information about the skin areas on the face. Further, the components may use an intelligent sliding window algorithm to assess color, texture, and shape information and determine a potential conditions associated with the facial region. The components may further measure how many consecutive image frames maintain a certain detected condition.

The components may also record metric data resulting from the image analysis. In particular, the metric data may indicate any measured metrics, their association with respective thresholds or detected conditions, occurrence times and locations, and/or other data. Additionally, the components may monitor for the vehicle to stop or cease operation, such as if a trip ends, the vehicle is turned off, or other conditions in which the vehicle is no longer operating. The components may generate a driving report after the vehicle is stopped or otherwise after a trip is completed, and where the driving report may include any generated metric data. Further, the driving report may be synced to a designated mobile device for review by an appropriate individual. The driving report may contain a summary of detected vehicle operating conditions, time-evolving graphs of tracked statistics, comparisons with driving histories to help operators keep track of their driving patterns, and/or other information.

Figure 3A:
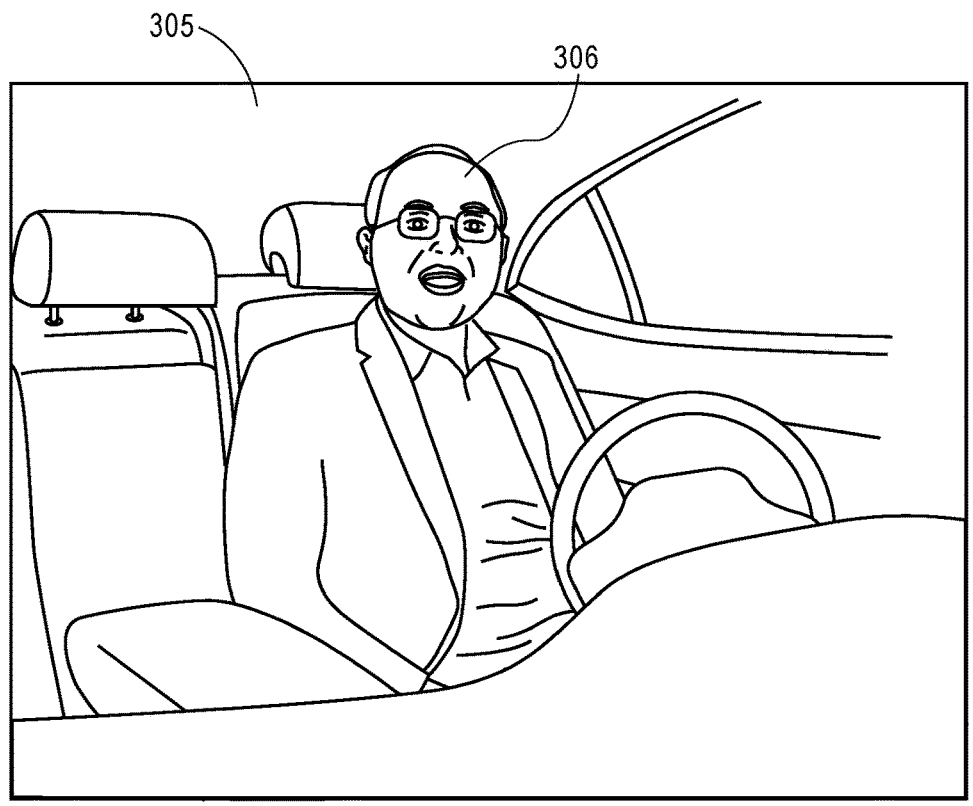
FIGS. 3A and 3B illustrate example interfaces associated with processing image frames included in image data, in accordance with some embodiments.
Figure 3B:
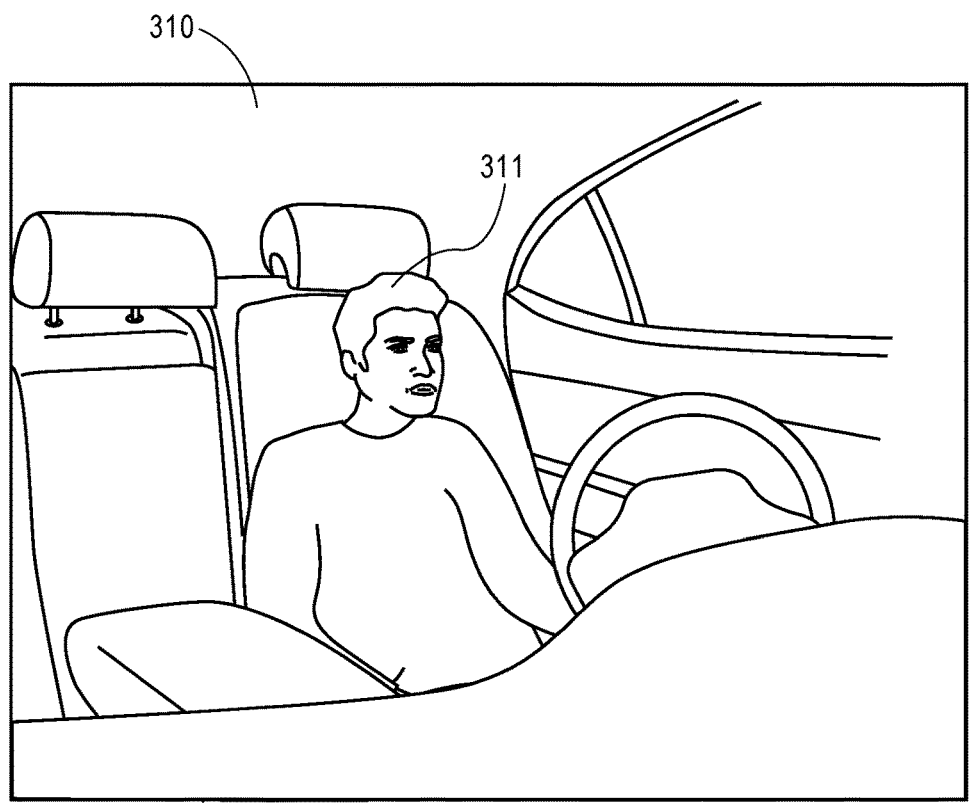

FIGS. 3A and 3B depict respective example interfaces 305, 310 associated with processing image frames included in image data, where the image frames depict various positionings of individual(s) located within vehicle(s). The interfaces include a representation of respective image frames as captured by an image sensor. In embodiments, a computing device may be configured to display the interfaces 305, 310, where the computing device may or may not be the device that analyzes the image frames. Further, the computing device may analyze the image data associated with the interfaces 305, 310 to assess the configuration of the vehicle, and in particular the positioning(s) of the individual(s) depicted in the image data, and facilitate any additional processing (e.g., facial recognition techniques). It should be appreciated that the interfaces are merely exemplary, and that additional and alternative content is envisioned.

The computing device may analyze the image data included in the interface 305 of FIG. 3A to determine the presence of an individual 306 operating the vehicle. The computing device may facilitate additional image data processing related to the individual 306. In particular, the computing device may perform a facial recognition technique to identify the individual 306 and subsequently access a set of preferences of the individual 306. Additionally, the computing device may determine or map various portions of the body (e.g., arms, head, torso, legs) of the individual 306 as depicted in the image data. Moreover, the computing device may determine a position of the relevant portion(s) of the individual 306 relative to one or more vehicle components. Using the mapped body portions and the determined position(s), the computing device may facilitate various of the vehicle component adjustment functionalities as discussed herein.

Similarly, the computing device may analyze the image data included in the interface 310 of FIG. 3B to determine the presence of an individual 311 operating the vehicle. The computing device may facilitate additional image data processing related to the individual 311. In particular, the computing device may perform a facial recognition technique to identify the individual 311 and subsequently access a set of preferences of the individual 311. Additionally, the computing device may determine or map various portions of the body (e.g., arms, head, torso, legs) of the individual 311 as depicted in the image data. Moreover, the computing device may determine a position of the relevant portion(s) of the individual 311 relative to one or more vehicle components. Using the mapped body portions and the determined position(s), the computing device may facilitate various of the vehicle component adjustment functionalities as discussed herein.

As depicted in FIGS. 3A and 3B, the individual 311 is smaller than the individual 306. Accordingly, the computing device may determine different respective configurations for the respective vehicle components. For example, the rear-view mirror may be adjusted to a lower angle for the individual 311 than for the individual 306.

FIGS. 4A and 4B depict example interfaces that may be displayed on an electronic device, such as an electronic device that supports the user interface 212 as discussed with respect to FIG. 2. In particular, the electronic device may display the interfaces in response to receiving a notification(s) of an adjustment(s) made to a vehicle component(s). It should be appreciated that the interfaces are merely exemplary, and that additional and alternative content is envisioned.

FIG. 4A illustrates an interface 405 including a notification of an adjustment to an airbag. In particular, the interface 405 indicates that the airbag was automatically adjusted so that it would deploy at an optimal angle and ensure maximum safety. The interface 405 may further include a more info selection 406 that, when selected, may retrieve additional information associated with the airbag adjustment; and an okay selection 407 that, when selected, may cause the interface 405 to be dismissed.

FIG. 4B illustrates an interface 410 including a notification of an adjustment to a head-up display (HUD). In particular, the interface 410 indicates that the HUD was automatically adjusted based on the preferences of the identified individual as well as the individual's positioning within the vehicle. The interface 410 may further include a more info selection 411 that, when selected, may retrieve additional information associated with the HUD adjustment; and an okay selection 412 that, when selected, may cause the interface 410 to be dismissed.

Figure 5:
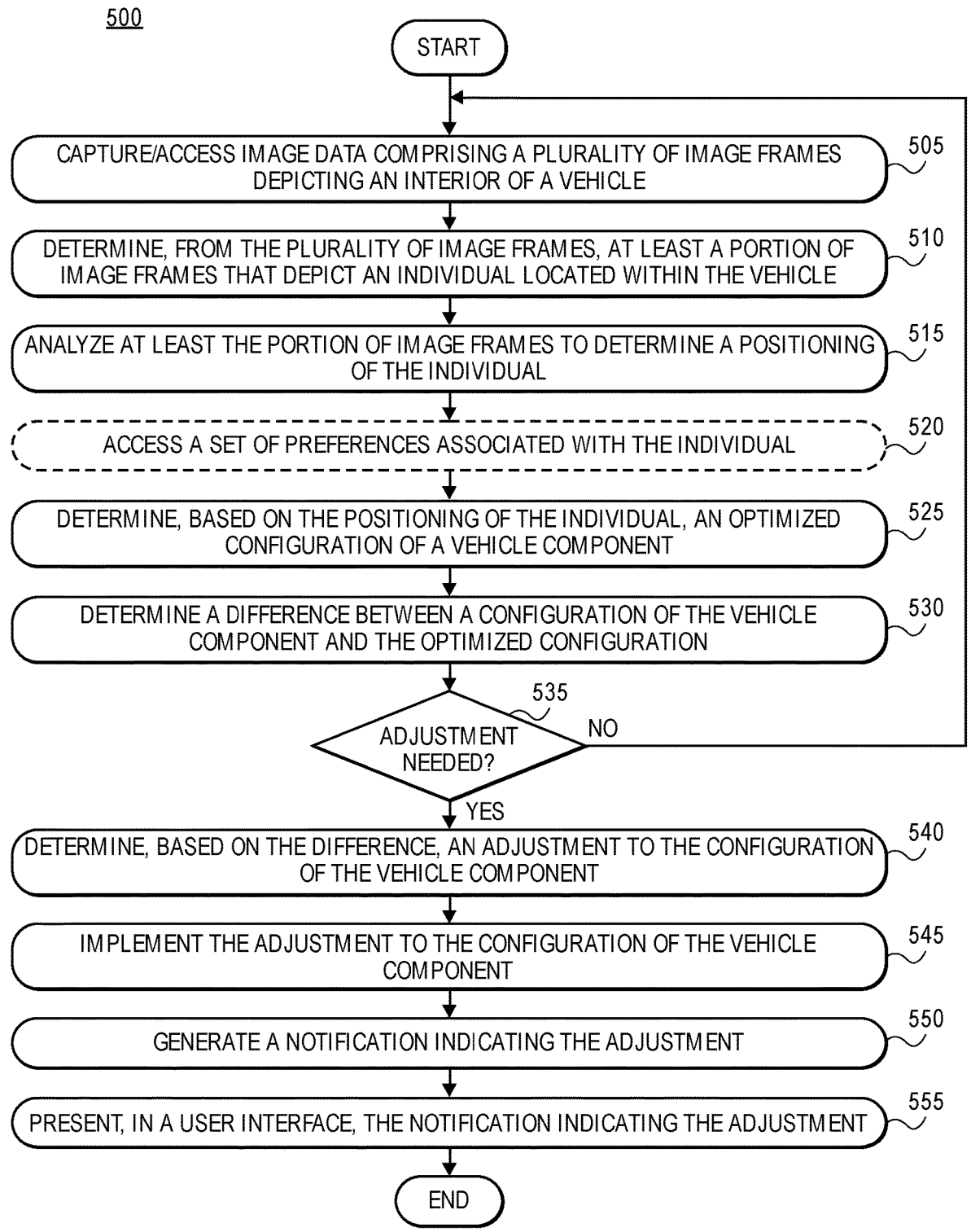
FIG. 5 depicts a block diagram of an example method of configuring a vehicle component within a vehicle, in accordance with some embodiments.

FIG. 5 depicts a block diagram of an example method 500 of configuring a vehicle component within a vehicle. The method 500 may be facilitated by at least one computing device that may be associated with the vehicle, where the computing device may be on board the vehicle. The computing device may be configured to communicate with one or more electronic devices or components, such as one or more image sensors.

The method 500 may begin when the computing device captures and/or accesses (block 505) image data, where the image data may include a plurality of image frames depicting an interior of the vehicle. According to embodiments, the computing device may access the image data from an external camera or image sensor that may continuously capture the image data, or may include a built-in camera that captures the image data.

The computing device may determine (block 510), from the plurality of image frames, at least a portion of the image frames that depict an individual located within the vehicle. In embodiments, at least the portion of the image frames may depict multiple individuals located within the vehicle, and/or may depict various body portions of the individual(s).

The computing device may analyze (block 515) at least the portion of image frames to determining a positioning of the individual. According to embodiments, the computing device may determine a head positioning (or a positioning(s) of other portion(s)) of the individual. The computing device may optionally access (block 520) a set of preferences associated with the individual, where the set of preferences may be stored locally or remotely. In an implementation, the computing device may utilize a facial recognition technique to identify the individual, and then access the set of preferences associated with the identified individual. Additionally or alternatively, the computing device may analyze at least the portion of image frames to estimate an age of the individual.

The computing device may determine (block 525), based on the positioning of the individual, an optimized configuration of a vehicle component. Additionally, the computing device may retrieve or access a current configuration of the vehicle component. The computing device may also determine (block 530) a difference between the current configuration and the optimized configuration of the vehicle component.

The computing device may determine (block 535) whether an adjustment to the vehicle component is needed. In embodiments, the computing device may determine that an adjustment is needed with there is a difference between the current configuration and the optimized configuration of the vehicle component. Additionally or alternatively, in determining whether the adjustment is needed, the computing device may account for any combination of the set of preferences of the individual and the estimated age of the individual. If the computing device determines that an adjustment is not needed ("NO"), processing may repeat, end, or proceed to other functionality. If the computing device determines that an adjustment is needed ("YES"), processing may proceed to block 540.

At block 540, the computing device may determine, based on the difference (and optionally on the set of preferences of the individual and/or the estimated age of the individual), an adjustment to the configuration of the vehicle component. In an embodiment, the vehicle component may be a dashboard user interface, and the computing device may determine a rotation angle for the dashboard user interface. In another embodiment, the vehicle component may be an airbag, and the computing device may determine a deployment angle for the airbag. In a further embodiment, the vehicle component may be a seat, and the computing device may determine a positioning for the seat.

The computing device may implement (block 545) the adjustment to the configuration of the vehicle component. In embodiments, the computing device may transmit a set of commands to the vehicle component that the vehicle component may execute to implement the adjustment.

At block 550, the computing device may generate a notification indicating the adjustment. In embodiments, the notification may indicate textual and/or graphical content that summarizes or identifies the adjustment. The computing device may further present (block 555), in a user interface, the notification indicating the adjustment.

FIG. 6 illustrates a hardware diagram of an example electronic device 605 (such as the infotainment device 120, the monitoring device 116, or the mobile computing device 119 as discussed with respect to FIG. 1, or the computing device 210 as discussed with respect to FIG. 2) and an example computing system 610 (such as the computing device 108 as discussed with respect to FIG. 1), in which the functionalities as discussed herein may be implemented.

The electronic device 605 may include a processor 672 as well as a memory 678. The memory 678 may store an operating system 679 capable of facilitating the functionalities as discussed herein as well as a set of applications 675 (i.e., machine readable instructions). For example, one of the set of applications 675 may be an image analysis application 690 configured to facilitate various of the functionalities as discussed herein. It should be appreciated that one or more other applications 692 are envisioned, such as an autonomous vehicle operation application.

The processor 672 may interface with the memory 678 to execute the operating system 679 and the set of applications 675. According to some embodiments, the memory 678 may also include image data 680 including data accessed or collected from image sensor(s). The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 605 may further include a communication module 677 configured to communicate data via one or more networks 620. According to some embodiments, the communication module 677 may include one or more transceivers (e.g., WWAN, WLAN, and/or WPAN transceivers) functioning in accordance with IEEE standards, 3GPP standards, or other standards, and configured to receive and transmit data via one or more external ports 676. For example, the communication module 677 may interface with another device, component, or sensors via the network(s) 620 to retrieve sensor data.

The electronic device 605 may include a set of sensors 671 such as, for example, a location module (e.g., a GPS chip), an image sensor, an accelerometer, a clock, a gyroscope, a compass, a yaw rate sensor, a tilt sensor, telematics sensors, and/or other sensors. The electronic device 605 may further include a user interface 681 configured to present information to a user and/or receive inputs from the user. As shown in FIG. 6, the user interface 681 may include a display screen 682 and I/O components 683 (e.g., ports, capacitive or resistive touch sensitive input panels, keys, buttons, lights, LEDs). According to some embodiments, the user may access the electronic device 605 via the user interface 681 to review information such as alerts or notifications, make selections, and/or perform other functions. Additionally, the electronic device 605 may include a speaker 673 configured to output audio data and a microphone 674 configured to detect audio.

In some embodiments, the electronic device 605 may perform the functionalities as discussed herein as part of a "cloud" network or may otherwise communicate with other hardware or software components within the cloud to send, retrieve, or otherwise analyze data.

As illustrated in FIG. 6, the electronic device 605 may communicate and interface with the computing system 610 via the network(s) 620. The computing system 610 may include a processor 659 as well as a memory 656. The memory 656 may store an operating system 657 capable of facilitating the functionalities as discussed herein as well as a set of applications 651 (i.e., machine readable instructions). For example, one of the set of applications 651 may be an image analysis application 652 configured to facilitate various of the functionalities discussed herein. It should be appreciated that one or more other applications 653 are envisioned.

The processor 659 may interface with the memory 656 to execute the operating system 657 and the set of applications 651. According to some embodiments, the memory 656 may also include image data 658, such as image data that is transmitted to the computing system 610 from the electronic device 605. The memory 656 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The computing system 610 may further include a communication module 655 configured to communicate data via the one or more networks 620. According to some embodiments, the communication module 655 may include one or more transceivers (e.g., WWAN, WLAN, and/or WPAN transceivers) functioning in accordance with IEEE standards, 3GPP standards, or other standards, and configured to receive and transmit data via one or more external ports 654. For example, the communication module 655 may receive, from the electronic device 605, a set(s) of image data.

The computing device 610 may further include a user interface 662 configured to present information to a user and/or receive inputs from the user. As shown in FIG. 6, the user interface 662 may include a display screen 663 and I/O components 664 (e.g., ports, capacitive or resistive touch sensitive input panels, keys, buttons, lights, LEDs). According to some embodiments, the user may access the computing device 610 via the user interface 662 to review information, make changes, input training data, and/or perform other functions.

In some embodiments, the computing device 610 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 672, 659 (e.g., working in connection with the respective operating systems 679, 657) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A system for configuring components of a vehicle, comprising:
    at least one image sensor configured to capture image data;
    a vehicle component;
    a non-transitory memory storing a set of computer-executable instructions; and
    a processor communicatively coupled to the at least one image sensor, the vehicle component, and the non-transitory memory, and configured to execute the computer-executable instructions to cause the processor to:

capture the image data with the at least one image sensor, the image data comprising a plurality of image frames depicting an interior of the vehicle, determine, from the plurality of image frames, at least a portion of image frames that depict an individual located within the vehicle, determine, using a machine learning algorithm and based on the portion of image frames, that the individual located within the vehicle is an authorized individual, determine, based on the portion of image frames, a positioning of the individual within the vehicle, determine, based on the positioning of the individual, an optimized configuration of the vehicle component that (i) was previously specified by a manufacturer, and (ii) represents an arrangement for an interaction between the individual and the vehicle component, determine, based on a difference between a configuration of the vehicle component and the optimized configuration of the vehicle component, that an adjustment to the configuration of the vehicle component is needed, based at least in part on determining that the adjustment is needed, generate a composite configuration adjustment based on the difference and a set of preferences associated with the individual;

cause the vehicle component to implement the composite configuration adjustment; and generate a driving report corresponding to a trip during which the vehicle component was utilized with the composite configuration adjustment, the driving report characterizing the set of preferences associated with the individual.

2. The system of claim 1, wherein the vehicle component is a dashboard user interface, and wherein to determine the adjustment to the configuration of the vehicle component, the processor is configured to:

determine, based on the difference, a rotation angle for the dashboard user interface.

3. The system of claim 1, wherein the vehicle component is an airbag, and wherein to determine the adjustment to the configuration of the vehicle component, the processor is configured to:

determine, based on the difference, a deployment angle for the airbag.

4. The system of claim 1, wherein the vehicle component is a seat, and wherein to determine the adjustment to the configuration of the vehicle component, the processor is configured to:

determine, based on the difference, a positioning for the seat.

5. The system of claim 1, wherein the processor is further configured to:

analyze, using a facial recognition technique, at least the portion of image frames to identify the individual, and access the set of preferences associated with the individual.

6. The system of claim 5, wherein the processor determines the adjustment to the configuration of the vehicle component further based on the set of preferences associated with the individual.

7. The system of claim 1, wherein to analyze at least the portion of image frames to determine the positioning of the individual within the vehicle, the processor is configured to:

analyze at least the portion of image frames to determine a head positioning of the individual.

8. The system of claim 1, wherein the processor is further configured to:

analyze, using an image analysis technique, at least the portion of image frames to estimate an age of the individual, and wherein the processor determines the adjustment to the configuration of the vehicle component further based on the age of the individual.

9. The system of claim 1, wherein the processor is further configured to:

generate a notification indicating the adjustment to the configuration, and cause a user interface to present the adjustment to the configuration.

10. A method of configuring a vehicle component within a vehicle, the vehicle component having a configuration, the method comprising:

capturing image data with at least one image sensor, the image data comprising a plurality of image frames depicting an interior of the vehicle;

determining, from the plurality of image frames, at least a portion of image frames that depict an individual located within the vehicle;

determining, using a machine learning algorithm and based on the portion of image frames, that the individual located within the vehicle is an authorized individual, determine, based on the portion of image frames, a positioning of the individual within the vehicle;

determining, based on the positioning of the individual, an optimized configuration of the vehicle component that (i) was previously specified by a manufacturer, and (ii) represents an arrangement for an interaction between the individual and the vehicle component;

determining, based on a difference between a configuration of the vehicle component and the optimized configuration of the vehicle component, that an adjustment to the configuration of the vehicle component is needed, based at least in part on the determination that the adjustment is needed, generating a composite configuration adjustment based on the difference and a set of preferences associated with the individual;

causing the vehicle component to implement the composite configuration adjustment to the configuration of the vehicle; and generating a driving report corresponding to a trip during which the vehicle component was utilized with the composite configuration adjustment, the driving report characterizing the set of preferences associated with the individual.

11. The method of claim 10, wherein the vehicle component is a dashboard user interface, and wherein determining the adjustment to the configuration of the vehicle component comprises:

determining, based on the difference, a rotation angle for the dashboard user interface.

12. The method of claim 10, wherein the vehicle component is an airbag, and wherein determining the adjustment to the configuration of the vehicle component comprises:

determining, based on the difference, a deployment angle for the airbag.

13. The method of claim 10, wherein the vehicle component is a seat, and wherein determining the adjustment to the configuration of the vehicle component comprises:

determining, based on the difference, a positioning for the seat.

14. The method of claim 10, further comprising:
  analyzing, using a facial recognition technique, at least the portion of image frames to identify the individual; and
  accessing the set of preferences associated with the individual.

15. The method of claim 14, wherein determining the adjustment to the configuration of the vehicle component comprises:
  determining, based on the positioning of the individual within the vehicle and the set of preferences associated with the individual, the adjustment to the configuration of the vehicle component.

16. The method of claim 10, wherein analyzing at least the portion of image frames to determine the positioning of the individual within the vehicle comprises:
  analyzing at least the portion of image frames to determine a head positioning of the individual.

17. The method of claim 10, wherein determining the adjustment to the configuration of the vehicle component comprises:
  analyzing, using an image analysis technique, at least the portion of image frames to estimate an age of the individual; and
  determining, based on the positioning of the individual within the vehicle and the age of the individual, the adjustment to the configuration of the vehicle component.

18. The method of claim 10, further comprising:
  generating a notification indicating the adjustment to the configuration, and
  presenting, in a user interface, the adjustment to the configuration.

19. The system of claim 1, wherein the processor is further configured to:
  based at least in part on determining that the adjustment is not needed, generate the adjustment based on the set of preferences associated with the individual.

20. The method of claim 10, further comprising:
  based at least in part on determining that the adjustment is not needed, generating the adjustment based on the set of preferences associated with the individual.

21. The system of claim 1, wherein determining, using a machine learning algorithm and based at least in part on the portion of image frames, that the individual located within the vehicle is an authorized individual further comprises:
  accessing, from a database, images associated with a set of authorized individuals,
  comparing, using the machine learning algorithm, the portion of image frames associated with the individual located within the vehicle with the images associated with the set of authorized individuals, and
  determining that the individual located within the vehicle is the authorized individual when a similarity between a face of the individual located within the vehicle and a face of one of the set of authorized individuals satisfies a threshold.

* * * * *